(12) United States Patent
Stocker

(10) Patent No.: US 7,797,682 B2
(45) Date of Patent: Sep. 14, 2010

(54) CONTROLLED EXECUTION OF A PROGRAM USED FOR A VIRTUAL MACHINE ON A PORTABLE DATA CARRIER

(75) Inventor: Thomas Stocker, Munich (DE)

(73) Assignee: Giesecke & Devrient GmbH, Munich (DE)

(*) Notice: Subject to any disclaimer, the term of this patent is extended or adjusted under 35 U.S.C. 154(b) by 1306 days.

(21) Appl. No.: 10/550,266

(22) PCT Filed: Mar. 22, 2004

(86) PCT No.: PCT/EP2004/003004

§ 371 (c)(1),
(2), (4) Date: Sep. 21, 2005

(87) PCT Pub. No.: WO2004/086220

PCT Pub. Date: Oct. 7, 2004

(65) Prior Publication Data

US 2007/0006224 A1 Jan. 4, 2007

(30) Foreign Application Priority Data

Mar. 25, 2003 (DE) .................................. 103 13 318

(51) Int. Cl.
*G06F 9/44* (2006.01)
*G06F 11/00* (2006.01)
(52) U.S. Cl. .................. 717/126; 717/134; 714/28; 714/31; 718/1
(58) Field of Classification Search ........................ None
See application file for complete search history.

(56) References Cited

U.S. PATENT DOCUMENTS 5,488,716 A   1/1996   Schneider et al.

(Continued)

FOREIGN PATENT DOCUMENTS

DE   197 39 513   9/1998

(Continued)

OTHER PUBLICATIONS

Rankl, Wolfgang. "Overview about attacks on smart cards." Available online Apr. 29, 2003. Information Security Technical Report vol. 8, Issue 1, Mar. 2003, pp. 67-84. Accessed online from Science Direction Jul. 21, 2009.*

(Continued)

*Primary Examiner*—Tuan Q Dam
*Assistant Examiner*—Erika Kretzmer
(74) *Attorney, Agent, or Firm*—Martine Penilla & Gencarella, LLP

(57) ABSTRACT

In a method for the controlled execution of a program (26), the program (26) being intended for a virtual machine (VM, VM'), on a portable data carrier, wherein the data carrier has a processor that executes at least a first and a second virtual machine (VM, VM'), the program (26) is executed both by the first and by the second virtual machine (VM, VM'). If, during execution of the program (26), a difference is found between the operating state of the first virtual machine (VM) and the operating state of the second virtual machine (VM'), execution of the program is aborted. A data carrier and a computer program product exhibit corresponding features. The invention provides a technique for the controlled execution of a program, which technique prevents security risks due to an attack or a malfunction of the data carrier.

18 Claims, 2 Drawing Sheets

U.S. PATENT DOCUMENTS

| | | | |
|---|---|---|---|
| 5,975,738 | A | 11/1999 | DeKoning et al. |
| 5,978,932 | A | 11/1999 | Nishiyuki et al. |
| 6,625,751 | B1 * | 9/2003 | Starovic et al. ............... 714/13 |
| 7,228,426 | B2 * | 6/2007 | Sinha et al. ................. 713/176 |
| 2003/0135790 | A1 | 7/2003 | Pignol |

FOREIGN PATENT DOCUMENTS

| | | |
|---|---|---|
| EP | 1 136 896 | 9/2001 |
| EP | 1 271 317 | 1/2003 |
| EP | 1271317 A1 * | 1/2003 |
| GB | 2 353 113 | 2/2001 |
| JP | 2000-155698 | 6/2000 |
| JP | 2001-188688 | 7/2001 |
| WO | WO 01/46805 | 6/2001 |

OTHER PUBLICATIONS

Rotenberg, Eric. "AR-SMT: Coarse-Grain Time Redundancy for High Performance General Purpose Processors." May 14, 1998. Course project paper published online at http://pages.cs.wisc.edu/~ericro/course_projects/course_projects.html. Accessed by examiner on Jul. 21, 2009.*

Chen, Yunqun, Ramarathnam Venkatesan, Matthew Cary, Ruoming Pang, Saurabh Sinha, and Mariusz H. Jakubowski. "Oblivious Hashing: A Stealthy Software Integrity Verification Primitive," Jan. 1, 2003. Springer. Lecture Notes in Computer Science, vol. 2578/2003. pp. 1-17. Retrived from SpringerLink on Apr. 22, 2010.*

Abstract of Japanese Patent Publication No. JP 3171233 Pub. Date: Jul. 24, 1991, esp@cenet database.

E. Rotenberg, "AR-SMT: A Microarchitectural Approach to Fault Tolerance in Microprocessors," *29th Fault-Tolerant Computing Symp. (FTCS-29)*, 1999, pp. 84-91 (XP-000873029).

W. Rankl et al., "Smart Card Handbook," 3rd Ed., John Wiley & Sons, Ltd., pp. 302-323.

Abstract of European Patent Publication No. EP 1 136 896 Pub. Date: Sep. 26, 2001, esp@cenet database.

Abstract of Japanese Patent Publication No. 2000-155698 Pub. Date: Jun. 6, 2000, Patent Abstracts of Japan.

T. Nguyen, "Enabling Java in Embedded Systems," *COTS Journal*, Dec. 2001, pp. 14 and 17-20 (XP-002317390) (retrieved from the Internet on Feb. 11, 2005 at URL: http://www.rtcgroup.com/cotsjournal/pdfs/2001/12/cots12-ruggedside.pdf).

Z. Chen, "*Java Card Technology for Smart Cards: Architecture and Programmer's Guide*," Addison Wesley, 2000, Chapters 3 and 9.

Abstract of Japanese Patent Publication No. 2001-188688 Pub. Date: Jul. 10, 2001, Patent Abstracts of Japan.

* cited by examiner

US 7,797,682 B2

CONTROLLED EXECUTION OF A PROGRAM USED FOR A VIRTUAL MACHINE ON A PORTABLE DATA CARRIER

BACKGROUND OF THE INVENTION

1. Field of the Invention

The invention relates generally to the technical field of executing a program that is intended for a virtual machine, on a portable data carrier that has a processor. A portable data carrier of that kind may be especially a chip card in various forms or a chip module. More specifically, the invention relates to the controlled execution of a program in order to detect faults or attacks and in order to prevent the security of the portable data carrier from being compromised by such faults or attacks.

2. Description of the Related Art

Portable data carriers that have a virtual machine for executing programs are known, for example, under the trademark Java Card™. Such data carriers are described in Chapter 5.10.2 of the book "Handbuch der Chipkarten" by W. Rankl and W. Effing, Hanser Verlag, $3^{rd}$ edition, 1999, pages 261 to 281. A detailed specification of the Java Card standard, the virtual machine JCVM (Java Card Virtual Machine) used therewith and of the programs (Java Card Applets) that are executed is to be found on the Internet pages of the company Sun Microsystems, Inc., at java.sun.com/products/javacard.

Portable data carriers are frequently used for applications where security is crucial, for example in connection with financial transactions or in electronic signature of documents. Techniques for attacking portable data carriers have already become known in which the execution of a program is disrupted by external interference. Such disruption may be caused, in particular, by voltage pulses, by the effect of heat or cold, by electric or magnetic fields, electromagnetic waves or particle radiation. For example, it is possible to alter register contents in the processor or memory contents by directing flashes of light onto the exposed semiconductor chip. Such interference may possibly compromise the security of the data carrier if, for example, the data carrier outputs a defectively encrypted text which, when analysed, allows inferences to be made about a secret key.

There is therefore the problem of safeguarding a data carrier of the kind mentioned in the introduction from being compromised by attacks that interfere with the execution of a program by a virtual machine.

GB 2 353 113 A discloses a computer network that is capable of compensating for software faults to a certain extent. At least two computers, each executing a virtual machine, are provided in that computer network. If one of the virtual machines is found to be operating incorrectly, execution of the program is continued by the other virtual machine or machines.

The system known from GB 2 353 113 A is foreign to the generic type in question here, since it is intended not for a portable data carrier but for a complex network comprising a plurality of computers. The virtual machines are executed by a plurality of processors which are only loosely coupled to one another. Execution of the program is continued even when one virtual machine is disrupted. That teaching is not suitable for application in a portable data carrier having a single processor.

SUMMARY OF THE INVENTION

An object of the invention is to avoid the problems of the prior art at least to some extent. In particular, the invention should provide a technique for the controlled execution of a program, the program being intended for a virtual machine, on a portable data carrier, by means of which technique security risks in the event of an attack or a malfunction are avoided. In some embodiments, reliable protection is to be achieved with as little loss of performance of the portable data carrier as possible.

According to the invention, the above object is completely or partially achieved by a method for the controlled execution of a program, the program being intended for a virtual machine, on a portable data carrier, wherein the data carrier has a processor which executes at least a first and a second virtual machine, the program is executed both by the first and by the second virtual machine, the operating state of the first virtual machine and the operating state of the second virtual machine are checked during execution of the program for correspondence, and execution of the program is aborted if a difference is found between the operating state of the first virtual machine and the operating state of the second virtual machine.

Further according to the invention, the above object is completely or partially achieved by a portable data carrier having a processor, an operating system, at least a first and a second virtual machine, and a program, wherein the processor executes both the first and second virtual machine, the program is executed both by the first and by the second virtual machine, the operating system controls the processor to check the operating state of the first virtual machine and the operating state of the second virtual machine during execution of the program for correspondence, and the operating system controls the processor to abort execution of the program if a difference is found between the operating state of the first virtual machine and the operating state of the second virtual machine.

Yet further according to the invention, the above object is completely or partially achieved by a computer program product having program instructions for causing a processor of a portable data carrier to perform a method for the controlled execution of a program, the program being intended for a virtual machine, wherein the processor executes at least a first and a second virtual machine, the program is executed both by the first and by the second virtual machine, the operating state of the first virtual machine and the operating state of the second virtual machine are checked during execution of the program for correspondence, and execution of the program is aborted if a difference is found between the operating state of the first virtual machine and the operating state of the second virtual machine.

The invention is founded on the basic idea of having the one processor of the portable data carrier execute a plurality of virtual machines which in turn execute one and the same program. This measure provides a redundancy in the program execution, which can be utilised to detect malfunctions. It is a surprising result of the present invention that such a redundancy can also be obtained in a portable data carrier that has only a single processor.

According to the invention, the execution of the program is aborted if a difference is found between the operating states of the virtual machines. An attempt is not made, therefore, to identify one of the virtual machines as operating correctly and to continue execution of the program with that virtual machine. By aborting the program as provided according to the invention, especially high security against attacks is achieved.

The invention offers the considerable advantage that it can be implemented without any difficulty on conventional hardware. In addition, no adaptation of the program that is to be executed to the attack protection according to the invention is required. All programs intended for the standard virtual machine will run unchanged on the data carriers configured in accordance with the invention, which greatly furthers the acceptance of the invention.

When the operating states of the virtual machines are being checked for correspondence, the comparison that takes place is preferably not a complete comparison. Rather, in preferred embodiments, merely a comparison of contents of a few important registers and/or memory contents is provided. The important registers in question may, for example, be the program counters and/or the stack pointers of the virtual machines. An example of important memory contents that are compared with one another in some embodiments of the invention is the most recent ("uppermost") element in the stacks of the virtual machines at the time in question.

Since the virtual machines on the portable data carrier are executed by a single processor, an interleaved program sequence generally takes place. That does not, however, exclude individual operations being executed truly in parallel if the processor of the portable data carrier is equipped to do so.

Checking of the operating states of the virtual machines may be carried out at any of the times when the virtual machines should have identical states if operating correctly. Although checking is not in principle tied, therefore, to the instruction boundaries of the program executed, in preferred embodiments it is provided that this checking is performed after each execution of an instruction of the program by the virtual machines. In alternative embodiments, the comparison of the virtual machines either may be carried out as soon as parts of instructions have been executed or may not be carried out until several instructions have been executed in each case.

Preferably, each instruction of the program is executed first by the first virtual machine and then by the second virtual machine. In some embodiments, execution of the instruction by the first virtual machine is first completed before the processor of the portable data carrier begins to execute the instruction using the second virtual machine. In other embodiments, on the other hand, the processor may execute each of a number of portions of the instruction first on the first virtual machine and then on the second virtual machine, provided, however, that the first virtual machine does not lag behind the second virtual machine.

Owing to the use of at least two—and in some embodiments more—virtual machines, the computing capacity available for each virtual machine is correspondingly reduced. With regard to the actual program run time, however, it should be borne in mind that, in a typical portable data carrier, a great deal of time is required for write operations to a non-volatile memory of the data carrier.

In preferred embodiments, therefore, it is provided that the virtual machines access a common heap in the non-volatile memory of the portable data carrier, with write operations being performed by only one of the virtual machines. The other virtual machine(s) may either skip the write operation entirely or, instead of performing the write operation, may check whether the location that is to be written to in the memory already contains the value that is to be written. If the program to be executed contains a large number of write operations to the heap, these will require a considerable proportion of the total run time. Through the use of the embodiment of the invention just described, that portion of the total run time remains unchanged whereas only the purely computing time of the processor—which, as mentioned, matters less—increases.

The portable data carrier according to the invention is preferably in the form of a chip card or a chip module. The computer program product according to the invention has program instructions for implementing the method according to the invention. Such a computer program product may be a physical medium, for example a semiconductor memory or a diskette or a CD-ROM, on which a program for executing a method according to the invention is stored. The computer program product may, however, alternatively be a non-physical medium, for example a signal transmitted via a computer network. The computer program product may especially be intended for use in connection with the production and/or initialisation and/or personalisation of chip cards or other data carriers.

In preferred embodiments, the data carrier and/or the computer program product have features corresponding to the features described above and/or to the features mentioned in the dependent method claims.

BRIEF DESCRIPTION OF THE DRAWINGS

Further features, advantages and objects of the invention will be apparent from the following detailed description of an illustrative embodiment and a number of alternative embodiments. Reference will be made to the schematic drawings, in which.

DETAILED DESCRIPTION OF EXEMPLARY EMBODIMENTS

Figure 1:
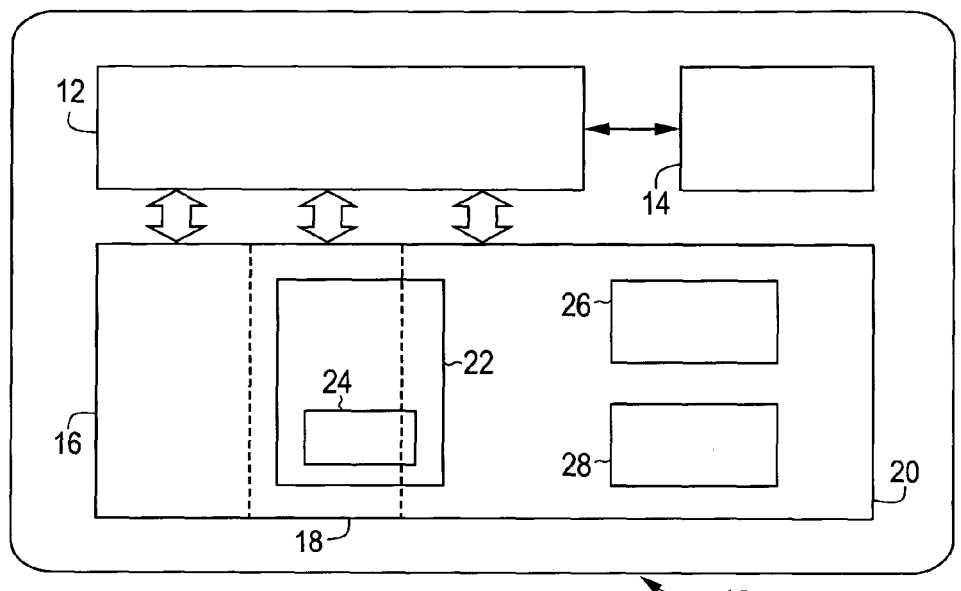
FIG. 1 is a block diagram showing functional units of a portable data carrier according to an illustrative embodiment of the invention.

In the illustrative embodiment under consideration, the data carrier 10 shown in FIG. 1 is in the form of a chip card conforming to the Java Card standard. The data carrier has, on a single semiconductor chip, a processor 12, a plurality of memory areas implemented in various technologies, and an interface circuit 14 for contactless or contact-bound communication. In the illustrative embodiment under consideration, a working memory 16, a read-only memory 18 and a non-volatile memory 20 are provided as memory areas. The working memory 16 is in the form of RAM, the read-only memory 18 in the form of mask-programmed ROM and the non-volatile memory 20 in the form of electrically erasable and programmable EEPROM. Write accesses to the non-volatile memory 20 are relatively time-consuming and require, for example, thirty times as long as a read access.

In the read-only memory 18—and partly also in the non-volatile memory 20—there is an operating system 22 which provides a multitude of functions and services. The operating system 22 comprises inter alia a code module 24 that implements a virtual machine—a JCVM (Java Card Virtual Machine) in the illustrative embodiment under consideration.

FIG. 1 shows by way of example a program 26 to be executed which is located in the non-volatile memory 20 and which, in the illustrative embodiment under consideration, is in the form of a Java Card Applet. The program 26 may also be held partly or completely in the read-only memory 18, and further programs for execution by the portable data carrier 10 may be provided. One area in the non-volatile memory 20 is reserved as a heap 28 in order for objects and other data structures to be held during execution of the program.

Figure 2:
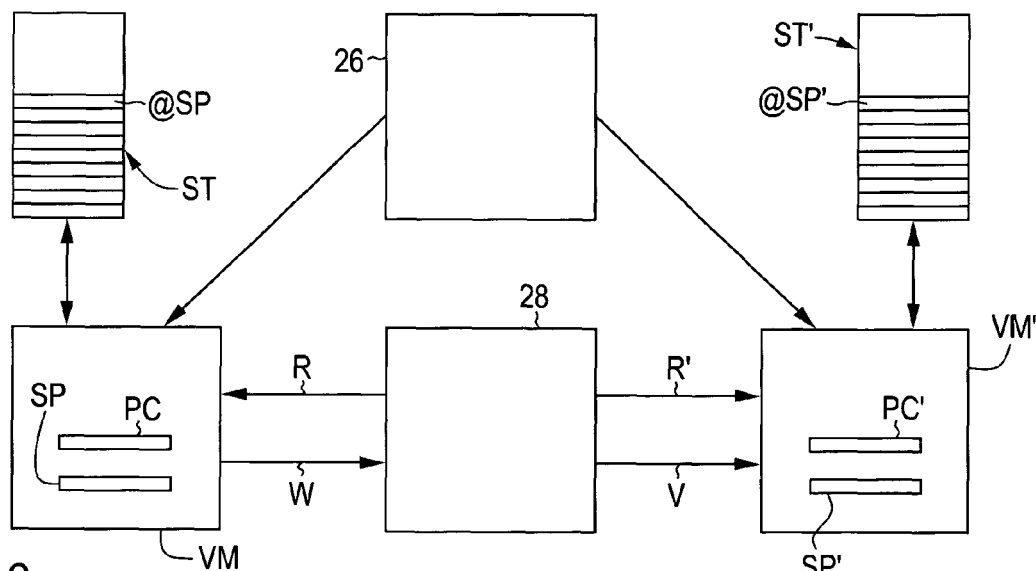
FIG. 2 is a conceptual illustration of components that are active when the program is being executed by the portable data carrier.

In order to execute the program 26 under the control of the operating system 22 the processor 12 starts two instances of the code module 24 each of which forms a virtual machine VM, VM'. As shown in FIG. 2, the two virtual machines VM, VM' execute one and the same program 26 which is present in the non-volatile memory 20 only once. When the two virtual machines VM, VM' fetch an instruction of the program 26, therefore, they access identical addresses in the non-volatile memory 20.

As the program runs, the two virtual machines VM, VM' perform access operations to the common heap 28. Once again, the objects and data structures stored in the heap 28 are each present only once. The first virtual machine VM performs both read operations R and write operations W on the heap 28. The second virtual machine VM', on the other hand, although performing read operations R', does not perform any write operations but, rather, performs verification operations V.

The virtual machines VM, VM' each have their own registers, FIG. 2 showing for each of the latter a program counter PC, PC' and a stack pointer SP, SP'. Those registers are disposed in the working memory 16 or are implemented by registers of the processor 12. Each virtual machine VM, VM' further has its own stack ST, ST' each disposed in a respective area of the working memory 16. The most recent ("uppermost") entries in the stacks ST, ST' at the time, to which the respective stack pointers SP, SP' point, are labeled @SP and @SP' in FIG. 2.

As a modification of the illustration shown in FIG. 1, the virtual machines VM, VM' may be disposed in separate hardware: in separate memories 20 which may also be assigned to separate processors. It may also be provided that the virtual machines VM, VM' be in the form of hardware components.

Figure 3:
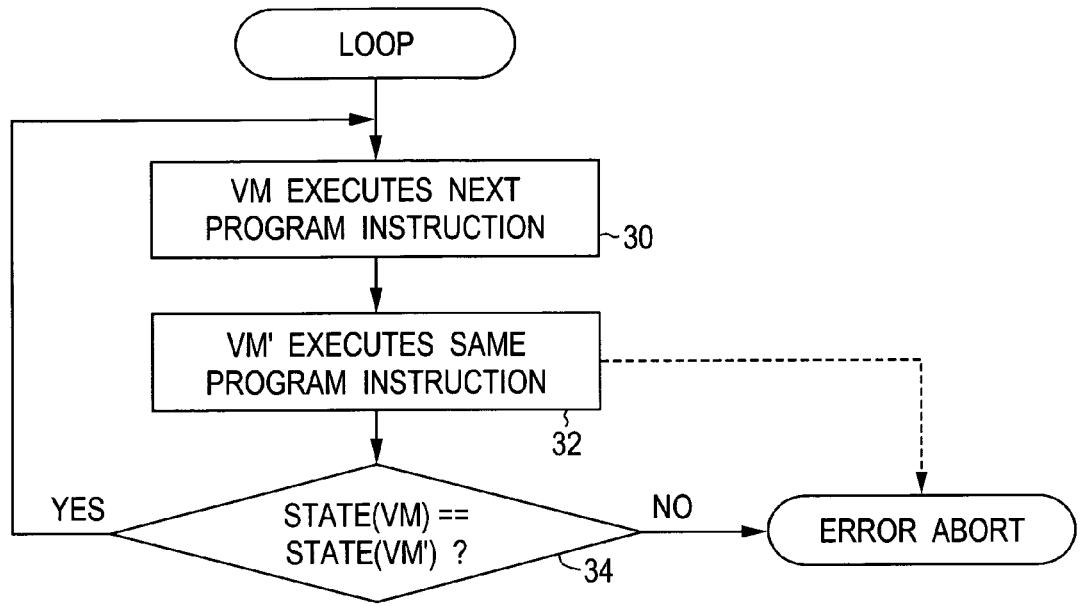
FIG. 3 is a flow diagram of a main loop which is followed for each program instruction during execution of the program.

When the program 26 is being executed, the operating system 22 follows the loop shown in FIG. 3. One pass of the loop is made for each instruction of the program 26. The instruction is first executed in step 30 by the first virtual machine VM. There are no differences here compared with the execution of a program in a prior art system by a single virtual machine. In particular, the first virtual machine maintains its registers PC and SP and the stack ST and, where appropriate, performs a read operation R from and/or a write operation W to the heap 28.

When execution of the instruction by the first virtual machine VM has been completed, in step 32 the second virtual machine VM' executes the same instruction of the program 26 again. In this case also, maintenance of the registers PC' and SP', maintenance of the stack ST' and, where appropriate, an operation R' of reading from the heap 28 are performed in the usual manner.

Execution of the instruction by the second virtual machine VM' differs, however, from execution of the instruction by the first virtual machine VM in that, instead of any write operation which may be specified by the instruction, a comparison operation V is performed in which the value that is actually to be written to the heap 28 is compared with the current contents of the heap 28 at the address that is to be written to. If the calculation operations of the two virtual machines VM, VM' correspond, then the first virtual machine VM has already written the value that is now determined in step 32 by the second virtual machine VM' to the heap 28 in step 30. The verification operation V in step 32 therefore yields a correspondence, and the calculation sequence is continued. If, on the other hand, a difference is found between the values in step 32, that indicates a malfunction of one of the virtual machines VM, VM'. Execution of the program is then aborted as being defective. That possibility is indicated in FIG. 3 by a dashed-line arrow.

Figure 4:
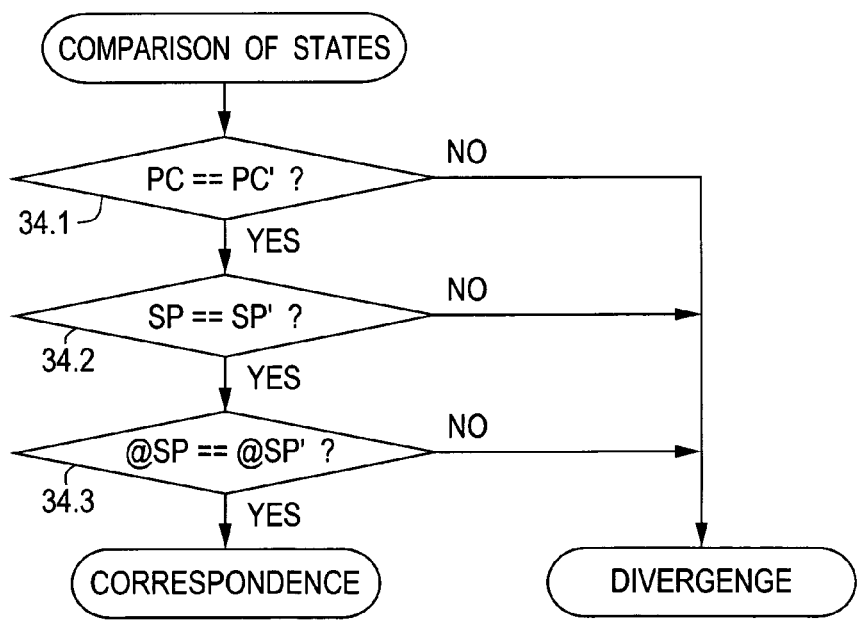
FIG. 4 is a flow diagram of the checking of the operating states of the virtual machines for correspondence.

After the program instruction has been executed by both virtual machines VM, VM', in step 34 it is examined whether the operating states reached by the two virtual machines correspond. For that purpose, in the illustrative embodiment described herein only some of the register and memory values are examined for correspondence, as shown in FIG. 4. First, in sub-step 34.1, it is examined whether the two program counters PC, PC' have the same value after the instruction has been executed. If that is the case, in sub-step 34.2 examination of the two stack pointers SP, SP' for correspondence takes place. If that test also is successful, in sub-step 34.3 it is examined whether the most recent entries @SP, @SP' in the stacks ST, ST' at the time, that is to say, the entries to which the stack pointers SP, SP' point, are identical.

If a correspondence has been found in all three queries 34.1, 34.2, 34.3, step 34 (FIG. 3) assumes correct execution of the program by the two virtual machines VM, VM'. A return is then made to the start of the loop, and the next instruction of the program 26 is executed first by the first and then by the second virtual machine VM, VM'.

If, however, a difference is found in one of the three sub-steps 34.1, 34.2, 34.3 during checking of the operating states, that indicates a malfunction of one of the two virtual machines VM, VM'. That in turn is regarded as an indication of a fault or of an attack on the hardware of the portable data carrier 10. Since the processor 12 performs steps 30 to 32 in strict succession, when an attack occurs, for example by a flash of light, only the operation of one of the two virtual machines VM, VM' is affected. Even in the event of a rapid succession of light flashes it would be improbable that both virtual machines VM, VM' would be disrupted in the same manner.

If a difference in the operating states is found in step 34, execution of the program is aborted as being defective. The operating system 22 then puts the data carrier 10 into a secure state. It is to be particularly noted in this connection that, after a program abort, the data carrier 10 is not intended to perform any more output operations. Depending on the security requirements to be met by the data carrier 10, it may be provided that the data carrier 10 is ready for use again after a normal reset, or a special enable procedure may be required, or the data carrier 10 may be completely deactivated.

The particulars contained in the above description of sample embodiments should not be construed as limitations of the scope of the invention, but rather as exemplifications of preferred embodiments thereof. Accordingly, the scope of the invention should be determined not by the embodiments illustrated, but by the appended claims and their legal equivalents.

What is claimed is:

1. A method for the controlled execution of a program, the program being intended for a virtual machine, on a portable data carrier, wherein
the data carrier has a processor which executes at least a first and a second virtual machine for each execution of the program,
the program is executed both by the first and by the second virtual machine,
the first and the second virtual machine both access a common heap in a non-volatile memory of the data carrier, wherein, when an instruction of the program that contains a write operation to the common heap is being executed, a write operation is performed only by the first virtual machine, an operating state of the first virtual machine and an operating state of the second virtual machine are checked during execution of the program for correspondence, and execution of the program is aborted if a difference is found between the operating state of the first virtual machine and the operating state of the second virtual machine.

2. A method according to claim 1, wherein checking of the operating state of the first virtual machine and of the operating state of the second virtual machine for correspondence comprises checking whether the state of a program counter of the first virtual machine is the same as the state of a program counter of the second virtual machine.

3. A method according to claim 1, wherein checking of the operating state of the first virtual machine and of the operating state of the second virtual machine for correspondence comprises checking whether the level of a stack pointer of the first virtual machine is the same as the level of a stack pointer of the second virtual machine.

4. A method according to claim 1, wherein checking of the operating state of the first virtual machine and the operating state of the second virtual machine for correspondence comprises checking whether a value of the most recent element in a stack associated with the first virtual machine is the same as a value of the most recent element in a stack associated with the second virtual machine.

5. A method according to claim 1, wherein checking of the operating state of the first virtual machine and of the operating state of the second virtual machine for correspondence is in each case performed after an instruction of the program has been executed both by the first and by the second virtual machine.

6. A method according to claim 1, wherein the instruction of the program is executed first by the first virtual machine and then by the second virtual machine, and, instead of performing the write operation, the second virtual machine checks whether a value that is to be written is present in the heap at the location that is to be written to.

7. A method according to claim 1, wherein the program is a Java Card Applet intended for execution by a JCVM (Java Card Virtual Machine).

8. A portable data carrier, having a processor, a non-volatile memory, an operating system, at least a first and a second virtual machine, and a program, wherein the processor executes both the first and second virtual machine, the program is executed both by the first and by the second virtual machine for each execution of the program, the first and the second virtual machine both access a common heap in the non-volatile memory of the data carrier, wherein, when an instruction of the program that contains a write operation to the common heap is being executed, the write operation is performed only by the first virtual machine, the operating system controls the processor to check the operating state of the first virtual machine and the operating state of the second virtual machine during execution of the program for correspondence, and the operating system controls the processor to abort execution of the program if a difference is found between the operating state of the first virtual machine and the operating state of the second virtual machine.

9. A portable data carrier according to claim 8, wherein the data carrier is one of a chip card and a chip module.

10. A portable data carrier according to claim 8, wherein checking of the operating state of the first virtual machine and of the operating state of the second virtual machine for correspondence comprises checking whether the state of a program counter of the first virtual machine is the same as the state of a program counter of the second virtual machine.

11. A portable data carrier according to claim 8, wherein checking of the operating state of the first virtual machine and of the operating state of the second virtual machine for correspondence comprises checking whether the level of a stack pointer of the first virtual machine is the same as the level of a stack pointer of the second virtual machine.

12. A portable data carrier according to claim 8, wherein checking of the operating state of the first virtual machine and the operating state of the second virtual machine for correspondence comprises checking whether the value of the most recent element in a stack associated with the first virtual machine is the same as the value of the most recent element in a stack associated with the second virtual machine.

13. A portable data carrier according to claim 8, wherein checking of the operating state of the first virtual machine and of the operating state of the second virtual machine for correspondence is in each case performed after an instruction of the program has been executed both by the first and by the second virtual machine.

14. A portable data carrier according to claim 8, wherein the instruction of the program is executed first by the first virtual machine and then by the second virtual machine, and, instead of performing the write operation, the second virtual machine checks whether the value that is to be written is present in the heap at the location that is to be written to.

15. A portable data carrier according to claim 8, wherein the program is a Java Card Applet intended for execution by a JCVM (Java Card Virtual Machine).

16. A tangible computer storage program product having program instructions for causing a processor of a portable data carrier to perform a method for the controlled execution of a program, the program being intended for a virtual machine, wherein the processor executes at least a first and a second virtual machine, the program is executed both by the first and by the second virtual machine for each execution of the program, the first and the second virtual machine both access a common heap in a non-volatile memory of the data carrier, wherein, when an instruction of the program that contains a write operation to the common heap is being executed, the write operation is performed only by the first virtual machine, the operating state of the first virtual machine and the operating state of the second virtual machine are checked during execution of the program for correspondence, and execution of the program is aborted if a difference is found between the operating state of the first virtual machine and the operating state of the second virtual machine.

17. A computer program product according to claim 16, wherein the instruction of the program is executed first by the first virtual machine and then by the second virtual machine, and, instead of performing the write operation, the second virtual machine checks whether the value that is to be written is present in the heap at the location that is to be written to.

18. A computer program product according to claim 16, wherein the program is a Java Card Applet intended for execution by a JCVM (Java Card Virtual Machine).

* * * * *